(12) United States Patent
Walters

(10) Patent No.: US 10,298,020 B2
(45) Date of Patent: May 21, 2019

(54) ROTOR SYNCHRONIZATION OF CROSS-COMPOUND SYSTEMS ON TURNING GEAR

(71) Applicant: General Electric Company, Schenectady, NY (US)

(72) Inventor: Lawrence Dean Walters, Moselle, MS (US)

(73) Assignee: General Electric Company, Schenectady, NY (US)

(*) Notice: Subject to any disclaimer, the term of this patent is extended or adjusted under 35 U.S.C. 154(b) by 566 days.

(21) Appl. No.: 15/070,448

(22) Filed: Mar. 15, 2016

(65) Prior Publication Data

US 2017/0271881 A1    Sep. 21, 2017

(51) Int. Cl.
*H02J 3/42* (2006.01)
*H02P 9/00* (2006.01)
(Continued)

(52) U.S. Cl.
CPC .................. *H02J 3/42* (2013.01); *H02P 9/00* (2013.01); *H02P 9/08* (2013.01); *H02P 9/307* (2013.01);
(Continued)

(58) Field of Classification Search
CPC ...... H02J 3/42; H02J 9/061; H02J 3/38; H02J 1/10; H02P 17/00; H02P 9/00; H02P 9/06; H02P 9/307; H02P 2203/00; H02P 1/46
(Continued)

(56) References Cited

U.S. PATENT DOCUMENTS 2,442,123 A   5/1948   Espley et al.
2,838,685 A   6/1958   Stineman
(Continued)

FOREIGN PATENT DOCUMENTS

JP    7241038 A  *  9/1995
JP    H07-241038 A   9/1995
JP    2000-166099 A  6/2000

OTHER PUBLICATIONS

An english translation has been provided for JP7241028A in a PDF form.*

(Continued)

*Primary Examiner* — Thienvu V Tran
*Assistant Examiner* — Brian K Baxter
(74) *Attorney, Agent, or Firm* — Mintz Levin Cohn Ferris Glovsky and Popeo, P.C.

(57) ABSTRACT

A method of synchronizing a cross-compound generator system on one or more turning gears during startup includes determining, via a notch monitor controller, first and second angular velocities, respectively, of a first and a second rotor. The method also includes simultaneously exciting, via the notch monitor controller, the first and second rotors to attain electromechanical coupling therebetween. The method further includes determining, via the notch monitor controller, a value of a time at which a calibration value of an offset is a constant value, where the offset is representative of a phase alignment of the first rotor relative to the second rotor, and where the offset is indicative of a successful electromechanical coupling therebetween. The method also includes disengaging the one or more turning gears from the cross-compound generator system.

14 Claims, 4 Drawing Sheets

(51) Int. Cl.
*H02P 9/08* (2006.01)
*H02P 9/30* (2006.01)
*H02P 17/00* (2006.01)

(52) U.S. Cl.
CPC .......... *H02P 17/00* (2013.01); *H02P 2203/00* (2013.01)

(58) Field of Classification Search
USPC ............................................................ 307/87
See application file for complete search history.

(56) References Cited

U.S. PATENT DOCUMENTS

| | | | |
|---|---|---|---|
| 2,943,307 A * | 6/1960 | Sampson | G01B 3/02 324/161 |
| 3,069,555 A | 12/1962 | Kessler | |
| 3,069,556 A | 12/1962 | Apfelbeck et al. | |
| 3,210,556 A | 10/1965 | Billings | |
| 3,226,561 A | 12/1965 | Labial | |
| 3,343,001 A | 9/1967 | Grimsdale et al. | |
| 3,466,456 A | 9/1969 | Tolworthy | |
| 3,493,778 A | 2/1970 | Cutler et al. | |
| 3,562,545 A | 2/1971 | Rubner et al. | |
| 3,601,619 A | 8/1971 | Ringstad | |
| 3,794,846 A | 2/1974 | Schlicher et al. | |
| 3,835,950 A * | 9/1974 | Asano | B61L 3/18 180/167 |
| 3,892,978 A | 7/1975 | Haley | |
| 4,536,126 A | 8/1985 | Reuther | |
| 2002/0167234 A1* | 11/2002 | Farkas | F02B 63/04 310/74 |
| 2008/0245071 A1* | 10/2008 | Kawakami | F01K 7/22 60/670 |
| 2010/0052450 A1* | 3/2010 | Hamann | B29C 45/5008 310/112 |
| 2014/0377079 A1* | 12/2014 | Gieras | F04B 35/04 417/15 |
| 2015/0372491 A1* | 12/2015 | Spisak | H02P 23/26 307/52 |
| 2016/0126875 A1* | 5/2016 | Bouheraoua | H02P 21/13 318/400.37 |

OTHER PUBLICATIONS

Lane, C.M.; Kuo, T.H. "Cross-Compound Turbine-Generator Turning-Gear Synchronization Study II—Field Test Investigation", Power Apparatus and Systems, Part III. Transactions of the American Institute of Electrical Engineers, On pp. 282-290 vol. 80, Issue: 3, Apr. 1961.

Lane, C.M.; Kuo, T.H. "Cross-Compound Turbine-Generator Turning-Gear Synchronization Study I—Analysis Using Automatic Digital Computation", Power Apparatus and Systems, Part III. Transactions of the American Institute of Electrical Engineers, on pp. 291-298 vol. 80, Issue: 3, Apr. 1961.

Extended European Search Report and Opinion issued in connection with corresponding EP Application No. 7160269.1 dated Sep. 8, 2017.

* cited by examiner

ROTOR SYNCHRONIZATION OF CROSS-COMPOUND SYSTEMS ON TURNING GEAR

BACKGROUND

The field of the disclosure relates generally to turbine generator systems, and, more specifically, to systems and methods for synchronizing two generators during startup on a turning gear.

At least some known turbine generator systems include a high-pressure (HP) unit and a low-pressure (LP) unit that have their own generators. In known cross-compound turbine generator systems, when a two pole (HP unit) generator is synchronized to a four pole (LP unit) generator on a turning gear, the field voltage for excitation is applied to both generators' rotors simultaneously. However, simultaneous field excitation during synchronization on a turning gear may be problematic because it depends on the location of the north and south poles of both generators when their rotors are excited. During turning gear startup of known cross-compound turbine generator systems, it is difficult, if not impossible, to determine the relative positions of the poles in either generator solely through excitation. When the HP pole leads the LP pole, for example, the LP rotor must increase speed to lock, i.e., "mesh", with the HP rotor, which may cause the LP rotor to come off of the turning gear as it is accelerated. In addition, during turning gear startup of known cross-compound turbine generator systems, deceleration of the HP rotor to mesh with the LP rotor often causes an increased load on the turning gear motor, which may lead to an overload trip, increased maintenance costs, and/or failure.

A similar outcome may arise in known cross-compound turbine generator systems when larger field voltages are used to cause the LP and HP rotors to pull in step faster. In such situations, when the LP pole leads the HP pole as the excitation field voltage is applied, the LP rotor slows down, which raises the load on the LP turning gear motor, and which may cause the HP unit to unmesh due to its acceleration. If the LP and HP rotors are substantially out of phase, the HP unit may accelerate past its synchronous position and may stop rotating. With too small a field on both generators, the LP rotor will continue to rotate and the HP rotor will remain stopped. With a sufficient field induced on both units, the HP unit will over-accelerate, come to a stop, and then start up again when the LP pole catches up to the corresponding HP pole and is in its synchronous position.

With some known cross-compound turbine generator systems, LP and HP generators on turning gear may be synchronized by increasing both generators to their respective synchronous speeds and then using an auxiliary throttle valve to bring the LP rotor speed up to match the HP rotor speed, at which time the excitation field voltage is applied. Similar to the simultaneous field excitation techniques for synchronization, the speed matching approach using the throttle valve may be problematic. As such, with at least some known cross-compound turbine generator systems, both synchronization approaches may lead to lengthy synchronization times during startup, increased stress and maintenance for turning gears, and require the use of complicated and expensive feedback and control systems. Further, known synchronization approaches for cross-compound turbine generator systems generally increase generation system maintenance costs and outage times.

BRIEF DESCRIPTION

In one aspect, a method of synchronizing a cross-compound generator system on one or more turning gears during startup is provided. The method includes determining, via a notch monitor controller, first and second angular velocities, respectively, of a first and a second rotor. The method also includes simultaneously exciting, via the notch monitor controller, the first and second rotors to attain electromechanical coupling therebetween. The method further includes determining, via the notch monitor controller, a value of a time at which a calibration value of an offset is a constant value, where the offset is representative of a phase alignment of the first rotor relative to the second rotor, and where the offset is indicative of a successful electromechanical coupling therebetween. The method also includes disengaging the one or more turning gears from the cross-compound generator system.

In another aspect, a synchronization system for a cross-compound generator is provided. The cross-compound generator includes a first rotor, a second rotor, and one or more turning gears coupled to at least one of the first and second rotors. The synchronization system includes a notch monitor controller coupled to the cross-compound generator, the notch monitor controller configured to determine a value of a time at which a calibration value of an offset is a constant value, where the offset is representative of a phase alignment of the first rotor relative to the second rotor, and where the offset is indicative of a successful electromechanical coupling therebetween. The system also includes a first sensor coupled to the cross-compound generator for detecting a rotation of the first rotor. The system further includes a second sensor coupled to the cross-compound generator for detecting a rotation of the second rotor, where the notch monitor controller is further configured to simultaneously excite the first and second rotors after the time at which the value of the offset is constant.

In yet another aspect, a power generation facility is provided. The power generation facility includes a cross-compound generator. The cross-compound generator includes a first generator having a first rotor, a second generator having a second rotor, and one or more turning gears rotatably coupled to at least one of the first and second rotors. The facility also includes a synchronization system. The synchronization system includes a notch monitor controller coupled to the cross-compound generator, where the notch monitor controller is configured to determine a value of a time at which a calibration value of an offset is a constant value, and where the offset is representative of a phase alignment of the first rotor relative to the second rotor, and where the offset is indicative of a successful electromechanical coupling therebetween. The system also includes a first sensor coupled to the cross-compound generator for detecting a rotation of the first rotor. The system further includes a second sensor coupled to the cross-compound generator for detecting a rotation of the second rotor, where the notch monitor controller is further configured to simultaneously excite the first and second rotors after the time at which the value of the offset is constant.

DRAWINGS

These and other features, aspects, and advantages of the present disclosure will become better understood when the following detailed description is read with reference to the accompanying drawings in which like characters represent like parts throughout the drawings, wherein.

Figure 1:
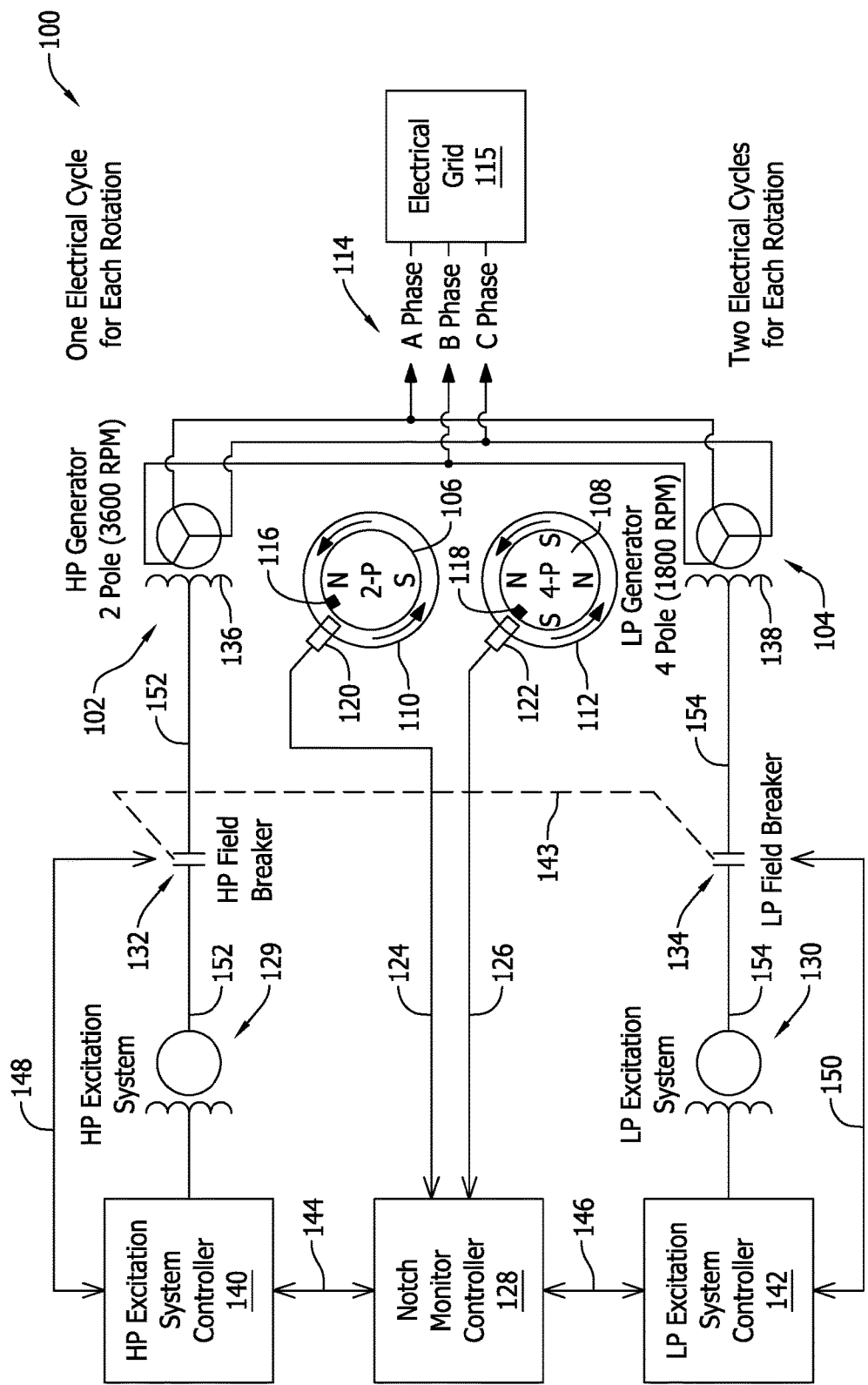
FIG. 1 is a schematic diagram of an exemplary cross-compound generator system.

Unless otherwise indicated, the drawings provided herein are intended to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Furthermore, as used herein, the term "real-time" refers to at least one of the times of occurrence of the associated events, the time of measurement and collection of predetermined data, the time to process the data, and the time of a system response to the events and the environment. In the embodiments described herein, these activities and events occur substantially instantaneously.

The systems and methods for synchronizing generators during startup on a turning gear described herein facilitate synchronization without regard to relative positions of respective poles. Moreover, the embodiments described herein also facilitate preventing overload stresses on turning gears in cross-compound turbine generator systems. In addition, the methods described herein facilitate reducing maintenance costs of turning gears and the failure rate of turning gears used with cross-compound turbine generator systems. Furthermore, the embodiments described herein also facilitate the use of larger field voltages, as compared to known systems, to enable the high pressure (HP) and low pressure (LP) rotors of cross-compound turbine generator systems to synchronize more quickly, and to obviate the need to use auxiliary throttle valves to bring the LP rotor speed up to the HP rotor speed during synchronization. Lastly, the embodiments described further facilitate reducing the synchronization time required during startup of cross-compound turbine generator systems, and reducing operating costs and outage times.

FIG. 1 is a schematic diagram of an exemplary cross-compound generator system 100. In the exemplary embodiment, generator system 100 includes a 2-pole (2-P) alternating current (AC) generator 102 (i.e., a first generator) and a 4-pole (4-P) AC generator 104 (i.e., a second generator). Both generators 102 and 104 include a 2-P rotor 106 (i.e., a first rotor) and a 4-P rotor 108 (i.e., a second rotor), respectively. Both generators 102 and 104 also include a non-rotating HP stator 110 (i.e., a first stator) and a non-rotating LP stator 112 (i.e., a second stator), respectively. Rotor 106 of generator 102 is rotatably coupled to an HP turbine, not shown, that functions as a prime mover for 2-P AC generator 102. Rotor 108 of generator 104 is rotatably coupled to an LP turbine, not shown, that functions as a prime mover for 4-P AC generator 104. Both generators 102 and 104 output a 3-phase AC power 114 to an electrical load coupled to an electrical grid 115.

In the exemplary embodiment, each rotor 106 and 108 includes an HP notch 116 (i.e., a first notch) and an LP notch 118 (i.e., a second notch) formed in, or coupled to, an outer surface of the circumference of each rotor 106 and 108, respectively. HP and LP notches 116 and 118 enable a determination of rotational characteristics of rotors 106 and 108 such as, without limitation, angular velocities (i.e., rotations per minute (RPM)). Further, in the exemplary embodiment, an HP sensor 120 (i.e., a first sensor) and an LP sensor 122 (i.e., a second sensor) are coupled to respective HP stator 110 and LP stator 112. Sensors 120 and 122 include a radially inward detector end and a radially outward connector end, each not shown. Sensors 120 and 122 detect passage of notches 116 and 118 adjacent detector ends of sensors 120 and 122 and respectively transmit an HP notch signal 124 (i.e., a first rotation signal) and an LP notch signal 126 (i.e., a second rotation signal) to a notch monitor controller 128. Notch monitor controller 128 is coupled to both HP sensor 120 and to LP sensor 122. Notch monitor controller 128 receives notch signals 124 and 126 and determines, through programmed instructions stored as software in a non-transient computer readable medium, rotational characteristics of 2-P rotor 106 and 4-P rotor 108.

Further, in the exemplary embodiment, cross-compound generator system 100 includes two excitation systems: an HP excitation system 129 (i.e., a first excitation system) and an LP excitation system 130 (i.e., a second excitation system). An HP field breaker 132 (i.e., a first field breaker) is coupled between 2-P AC generator 102 and HP excitation system 129. An LP field breaker 134 (i.e., a second field breaker) is coupled between 4-P AC generator 104 and LP excitation system 130. HP and LP excitation systems 129 and 130 supply direct current (DC) to excite an HP field winding 136 (i.e., a first field winding) and an LP field winding 138 (i.e., a second field winding) coupled to 2-P generator 102 and 4-P generator 104, respectively. Furthermore, in the exemplary embodiment, HP field breaker 132 and LP field breaker 134 function as controllable switches that alternately enable and prevent a flow of electrical current from excitation systems 129 and 130 to field windings 136 and 138, respectively.

Furthermore, in the exemplary embodiment, generator system 100 includes two excitation system controllers: an HP excitation system controller 140 (i.e., a first excitation controller) and an LP excitation system controller 142 (i.e., a second excitation controller). HP excitation system 129 is coupled to HP excitation system controller 140 and to notch monitor controller 128. LP excitation system 130 is coupled to LP excitation system controller 142 and to notch monitor controller 128. Moreover, in the exemplary embodiment, generator system 100 includes an interconnect 143 coupled to HP field breaker 132 and LP field breaker 134 to facilitate HP field breaker 132 and LP field breaker 134 alternately opening and closing together. In other embodiments, interconnect 143 is not coupled between HP excitation system 129 and LP excitation system 130.

Moreover, in the exemplary embodiment, HP excitation system controller 140 transmits and/or receives an HP excitation control signal 144 (i.e., a first excitation control signal) to and/or from notch monitor controller 128. Similarly, LP excitation system controller 142 transmits and/or receives an LP excitation control signal 146 (i.e., a second excitation control signal) to and/or from notch monitor controller 128. Also, in the exemplary embodiment, HP excitation system controller 140 transmits and/or receives an HP field breaker control signal 148 (i.e., a first field breaker control signal) to and/or from HP field breaker 132. LP excitation system controller 142 transmits and/or receives an LP field breaker control signal 150 (i.e., a second field breaker control signal) to and/or from LP field breaker 134. In other embodiments, LP excitation system controller 140 and/or LP excitation system controller 142 does not transmit and/or receive HP and LP field breaker control signals 148 and 150. HP and LP field breaker control signals 148 and 150 control opening and closing of HP and LP field breakers 132 and 134, respectively, in response to physical conditions associated with 2-P and 4-P AC generators 102 and 104, and/or DC electrical lines 152 and 154 coupled HP and LP field breakers 132 and 134 and 2-P and 4-P AC generators 102 and 104, respectively. Such physical conditions may include measurable electrical parameters such as, without limitation, a voltage, a current, a frequency, and a phase.

During operation, in the exemplary embodiment, cross-turbine generator system 100 is brought up to speed on turning gear. Also, in operation of the exemplary embodiment, 2-P rotor 106 has its own respective turning gear rotatably coupled thereto, and 4-P rotor 108 has its own respective and separate turning gear. During startup of cross-turbine generator system 100, 3-phase AC power 114 is not supplied to electrical loads coupled to cross-turbine generator system 100 until HP and LP field breakers (132, 134) are closed. Cross-turbine generator system 100 is positioned within and operates in a power generation facility 156, indicated by a dashed line box surrounding cross-compound generator system 100 in FIG. 1.

Figure 2:
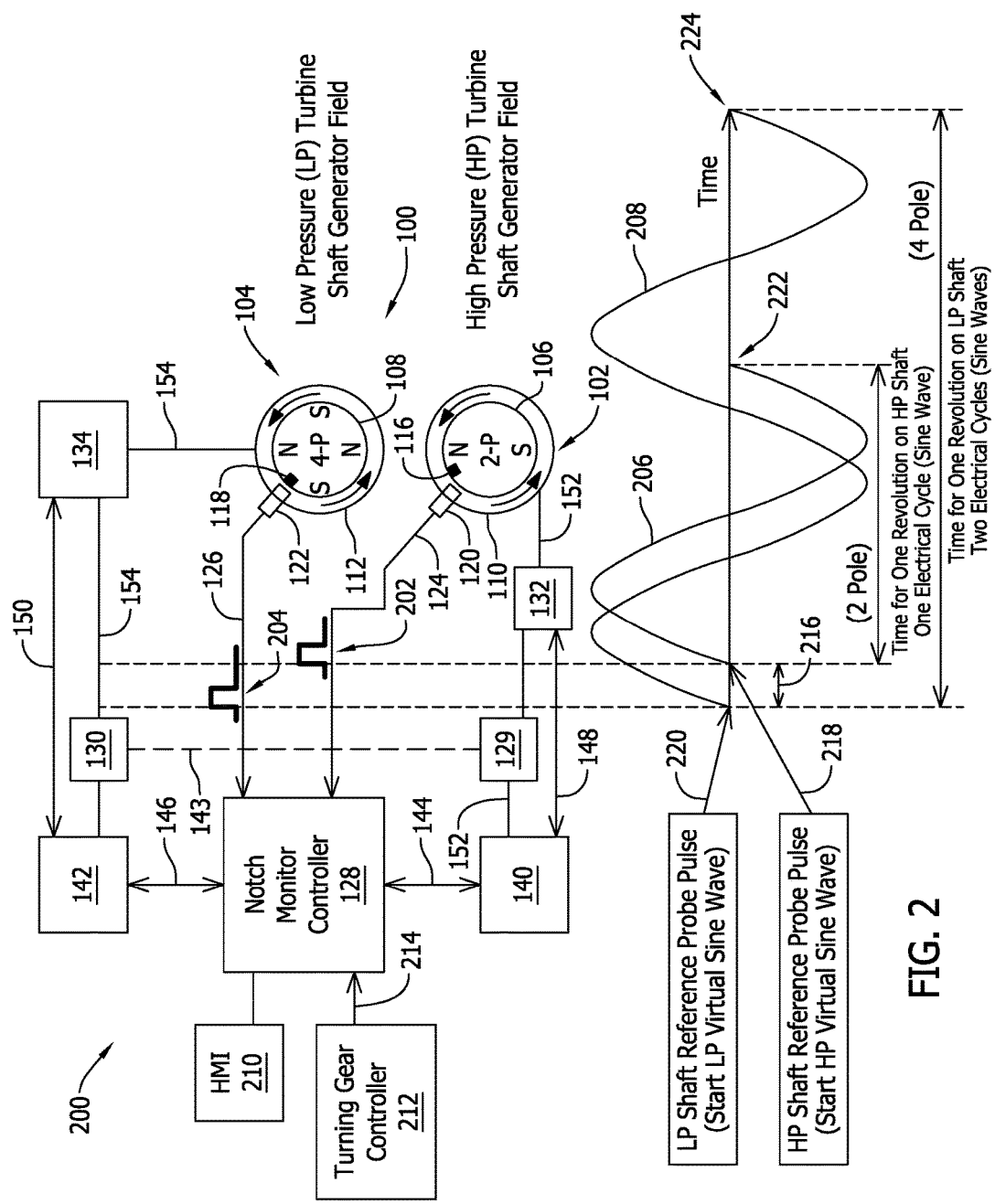
FIG. 2 is a schematic diagram of an exemplary rotor synchronization system, prior to synchronization, that may be used in the cross-compound generator system shown in FIG. 1.

FIG. 2 is a schematic diagram of an exemplary embodiment of a rotor synchronization system 200, prior to synchronization, that may be used with the cross-compound generator system 100 (shown in FIG. 1). In the exemplary embodiment, prior to synchronization, rotor synchronization system 200 includes 2-P AC generator 102 with 2-P rotor 106, HP notch 116, and HP sensor 120 coupled thereto, as shown and described above with reference to FIG. 1. Rotor synchronization system 200 also includes 4-P AC generator 104 with 4-P rotor 108, LP notch 118, and LP sensor 122 coupled thereto, as shown and described above with reference to FIG. 1. Also, in the exemplary embodiment, HP sensor 120 and LP sensor 122 transmit HP notch signal 124 and LP notch signal 126, respectively, once per revolution of 2-P rotor 106 and 4-P rotor 108. In the exemplary embodiment, HP and LP notch signals 124 and 126 are transmitted to notch monitor controller 128 in the form of electrical square-wave pulses (an HP square-wave pulse 202 (i.e., a first square-wave pulse) and an LP square-wave pulse 204 (i.e., a second square-wave pulse)), with one square pulse per revolution of 2-P rotor 106 and 4-P rotor 108, respectively. In other embodiments, HP and LP notch signals 124 and 126 are transmitted to notch monitor controller 128 as electrical pulses in a form other than square-wave electrical pulses 202 and 204, such as, for example, triangle-wave electrical pulses or optical pulses, and at transmission frequencies other than one pulse per revolution, such as, for example, a higher transmission frequency resulting from greater than one notch 116 and 118 per rotor 106 and 108.

Also, in the exemplary embodiment, notch monitor controller 128 receives notch signals 124 and 126 and determines rotational characteristics of 2-P rotor 106 and 4-P rotor 108. Notch monitor controller 128 uses notch signals 124 and 126 to determine, for example, RPMs of 2-P rotor 106 (i.e., a first angular velocity) and 4-P rotor 108 (i.e., a second angular velocity) including, without limitation, while rotors 106 and 108 are rotated by their respective turning gears. Further, in the exemplary embodiment, such RPM determinations are used by notch monitor controller 128 to determine an HP virtual sine wave 206 (i.e., a first virtual sine wave) and an LP virtual sine wave 208 (i.e., a second virtual sine wave). HP virtual sine wave 206 includes one sine wave period per revolution of 2-P rotor 106, and LP virtual sine wave 208 includes two sine wave periods per revolution of 4-P rotor 108. One or both of HP and LP virtual sine waves 206 and 208 are displayed to operators of rotor synchronization system 200, prior to synchronization, on a human-machine interface (HMI) 210 coupled to notch monitor controller 128. In other embodiments, not shown, HMI 210 is not included in rotor synchronization system 200.

In the exemplary embodiment, notch monitor controller 128 outputs one rotational period of HP virtual sine wave 206 (i.e., a first rotational period) per revolution of 2-P rotor 106, and one rotational period of LP virtual sine wave 208 (i.e., a second rotational period) per revolution of 4-P rotor 108. HP virtual sine wave 206 and LP virtual sine wave 208 are thus representative of one electrical cycle of 2-P AC generator 102 and two electrical cycles of 4-P AC generator 104, respectively, regardless of a relative position of 2-P rotor 106 and 4-P rotor 108 notches 120 and 122. Furthermore, in the exemplary embodiment, rotor synchronization 200 includes a turning gear controller 212. Turning gear controller 212 transmits and/or receives a turning gear signal 214 to/from notch monitor controller 128. When 2-P rotor 106 and/or 4-P rotor 108 are on the turning gear, turning gear controller 212 transmits turning gear signal 214 having a first value to notch monitor controller 128. When 2-P rotor 106 and/or 4-P rotor 108 are not on the turning gear, however, turning gear controller 212 transmits turning gear signal 214 having a second value to notch monitor controller 128, where the second value is different from the first value. As such, turning gear signal 214 facilitates an indication, including, without limitation, indication through HMI 210, to inform operators of rotor synchronization system 200 of whether or not 2-P rotor 106 and/or 4-P rotor 108 are rotatably coupled to the turning gear.

Furthermore, notch monitor controller 128 also determines a value, for example a time, degree and/or radian value, of an offset 216 during a calibration procedure of cross-compound generator system 100 with rotor synchronization system 200, as further described below. Offset 216 represents a difference between an HP zero crossing time 218 (i.e., a first zero crossing time) and an LP zero crossing time 220 (i.e., a second zero crossing time) of HP virtual sine wave 206 and LP virtual sine wave 208, respectively. As such, offset 216 further represents a phase alignment of the first rotor 106 relative to the second rotor 108. Notch monitor controller 128 also determines an HP rotational period 222 (i.e., a first rotational period) of 2-P rotor 106 and an LP rotational period 224 (i.e., a second rotational period) of 4-P rotor 108. Determined values of HP and LP rotational periods 222 and 224 enable notch monitor controller 128 to determine RPMs at which 2-P rotor 106 and 4-P rotor 108 respectively rotate in cross-compound generator system 100. Additional reference numbers are included in FIG. 2 to facilitate cross-referencing of FIG. 2 with FIG. 1 and additional figures described below.

During operation, in the exemplary embodiment, a calibration procedure must be performed after installation of cross-compound generator system 100 with rotor synchronization system 200 and prior to use thereof to supply electrical power to electrical grid 115. Upon first startup of cross-compound generator system 100 with rotor synchronization system 200 in a power generation facility, for example, HP and LP virtual sine waves 206 and 208 facilitates completion of a rotor lock sequence for 2-P rotor 106 and 4-P rotor 108 during startup of cross-compound generator system 100 on the turning gears. Additional instrumentation, such as a synchroscope (not shown) may be used during the rotor lock sequence. Generally, during startup on turning gears of generator system 100, turning gear accelerates the rotation of 2-P rotor 106 and 4-P rotor 108, resulting in increasing RPMs and decreasing rotational periods 222 and 224 thereof, respectively. Determination of HP and LP rotational periods 222 and 224 enables notch monitor controller 128 to determine the RPMs at which 2-P rotor 106 and 4-P rotor 108 are rotating at any given time during startup of cross-compound generator system 100.

Also, during operation, the calibration procedure of cross-compound generator system 100 with rotor synchronization system 200 includes determination of the value of offset 216 by notch monitor controller 128 enables notch monitor controller 128 to determine a degree to which 2-P rotor 106 and 4-P rotor 108 are out of phase during startup on turning gear of cross-compound generator system 100. For example, during acceleration of 2-P rotor 106 and 4-P rotor 108 by turning gear during startup, offset 216 will not be a constant valued number by virtue of varying angular acceleration values of 2-P rotor 106 and 4-P rotor 108. As 2-P rotor 106 and 4-P rotor 108 both approach, but not necessarily attain, constant set point velocities which are less than their respective synchronous speeds (as for example, indicated by HP and LP virtual sine waves 206 and 208 and/or synchroscope), a rotor lock sequence is performed to simultaneously excite both 2-P field winding 136 and 4-P field winding 138. Simultaneous excitation of 2-P field winding 136 and 4-P field winding 138 is initiated when an operator and/or the rotor synchronization system 200 determines that 4-P rotor 108 (which generally rotates more slowly on its turning gear than the 2-P rotor 106 during startup) LP sine waves 208 are catching up to 2-P rotor 106 HP sine waves 206. This condition corresponds to 2-P rotor 106 rotating at substantially twice the angular velocity of 4-P rotor 108. Upon simultaneous excitation of 2-P field winding 136 and 4-P field winding 138, 2-P rotor 106 disengages, i.e., rolls off, its turning gear, due to acceleration on account of field excitation and electromechanical coupling and including, without limitation, through the action of a jaw clutch mechanism, not shown. After this step in the calibration procedure, cross-compound generator system 100 is thus rotated on the 4-P rotor 108 turning gear only. The operator and/or rotor synchronization system 200 observes rotational characteristics for at least two full revolutions (i.e., which corresponds to a predetermined amount of time) of both 2-P rotor 106 and 4-P rotor 108 to confirm successful rotor lock, including determining that the value of offset 216 is constant, as described above. In other embodiments, not shown, the predetermined amount of time is representative of a fewer number than, or a greater number than, two revolutions of 2-P rotor 106 and 4-P rotor 108, depending on the configurations and/or applications of rotor synchronization system 200.

After a successful rotor lock sequence during the calibration procedure, 2-P rotor 106 and 4-P rotor 108 obtain constant angular velocities, and their respective angular acceleration values will both be substantially zero since cross-compound generator system 100 will be rotating as a coupled unit by only the 4-P rotor 108, with the 2-P rotor 106 electromechanically coupled to the 4-P rotor 108. At that time, the value of offset 216 will be a substantially constant value and/or will be confined to a predetermined tolerance (i.e., a range of acceptable values between a first constant valued number and a second constant valued number, where the first constant valued number is of a different value than the second constant valued number). When offset 216 is determined by notch monitor controller 128 to be a constant valued number, including, without limitation, a predetermined constant valued number, the value of offset 216 is stored as data in memory by notch monitor controller 128 and may be additionally recorded in other tangible forms by operator and/or rotor synchronization system 200 as, for example, a paper printout or as a handwritten entry. As such, HP and LP virtual sine waves 206 and 208 illustrated in FIG. 2 represent the constant valued offset 216 determined in the calibration procedure, as described above. FIG. 2 is also representative of a pre-calibrated cross-compound generator system 100 with rotor synchronization system 200 that is being restarted after a shutdown event not requiring re-calibration. Assuming the calibration procedure has been performed, after initial start-up, rotor synchronization system 200 transitions to an operational mode enabling synchronization of cross-compound generator system 100, as described in more detail below with reference to FIG. 3.

Figure 3:
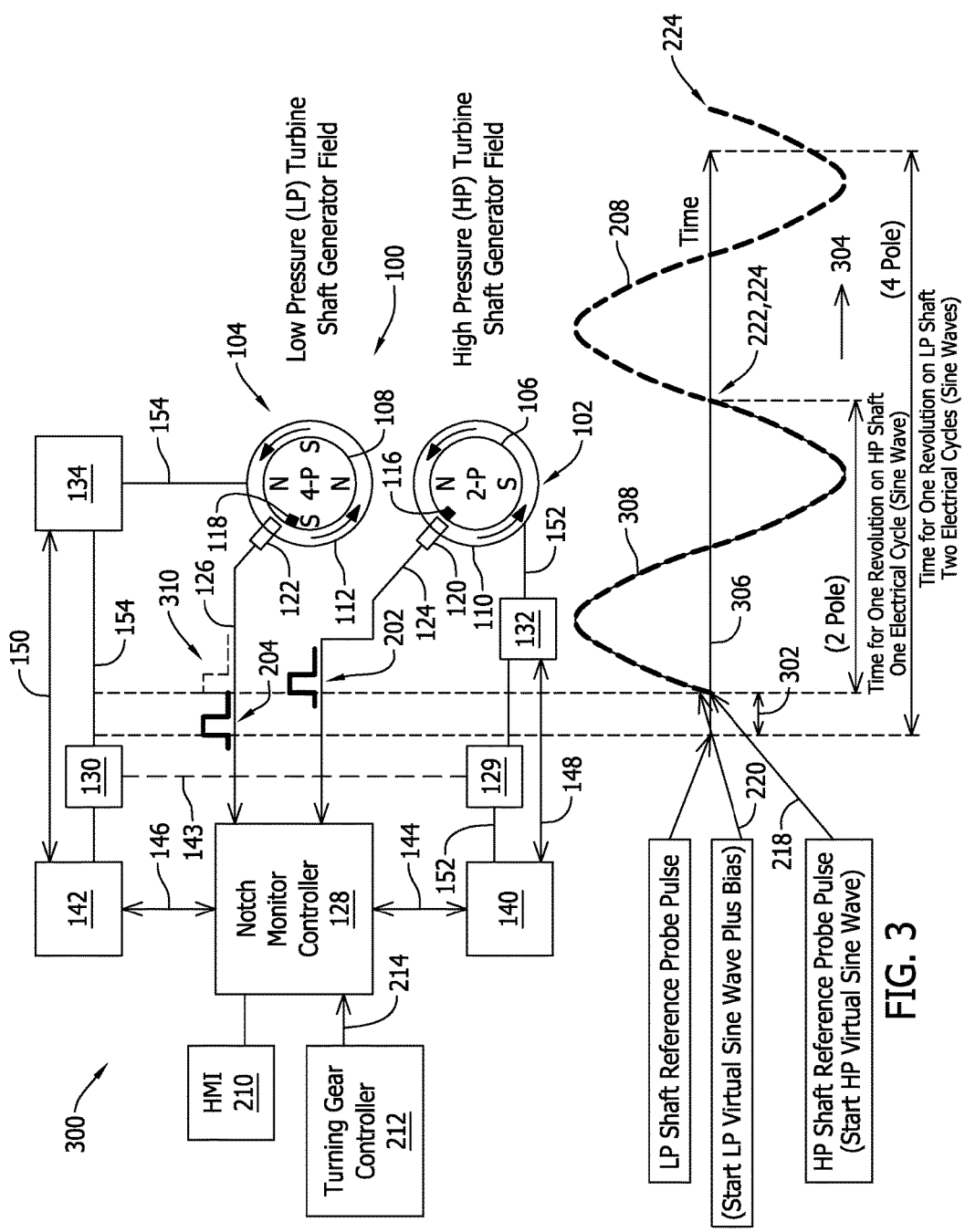
FIG. 3 is a schematic diagram of an exemplary embodiment of a rotor synchronization system, at synchronization, that may be used in the cross-compound generator system shown in FIG. 1.

FIG. 3 is a schematic diagram of an exemplary rotor synchronization system 300, at synchronization, that may be used in the cross-compound generator system 100 (shown in FIG. 1). In the exemplary embodiment, 2-P rotor 106 and 4-P rotor 108 are electrically locked and offset 216 is a substantially constant value to facilitate transitioning cross-compound generator system 100 to its operational mode. Also, in the exemplary embodiment, notch monitor controller 128 determines the value of a bias 302 which is substantially equivalent to value of offset 216. Notch monitor controller 128 is further configured to shift LP virtual sine wave 208 by an amount of time substantially equivalent to the value of bias 302, such that HP zero crossing time 220 is substantially equivalent to LP zero crossing time 218. In an alternative embodiment, shifting of LP virtual sine wave 208 by the value of bias 302 occurs during calibration. Further, in the exemplary embodiment, LP virtual sine wave 208 shifts to the right 304, i.e., ahead in time, on a time scale 306. In other exemplary embodiments, not shown, LP virtual sine wave 208 leads HP virtual sine wave 206 (shown in FIG. 2) on time scale 306 after the value of offset 216 is substantially constant (i.e., substantially steady-state) value, and HP virtual sine wave 206 shifts right 304 on time scale 306.

Also, in the exemplary embodiment, persistence of a virtually synchronized sine wave 308 resulting from notch monitor controller 128 applying the value of bias 302 to either HP virtual sine wave 206 or to LP virtual sine wave 208 for the predetermined amount of time prompts operator and/or rotor synchronization system 300 to increase the angular velocity of cross-compound generator system 100 by, for example, admitting steam into the prime mover turbines. Thus, accelerating cross-compound generator system 100 causes 4-P rotor 108 to disengage from its respective turning gear, including, without limitation, through the action of a jaw clutch mechanism, not shown. Additional reference numbers are included in FIG. 3 to facilitate cross-referencing of FIG. 3 with the description of FIG. 4 below.

In operation, in the exemplary embodiment, the value of bias 302 and shifting of LP virtual sine wave 208 to the right 304 of time scale 306, i.e., as displayed on HMI 210, is accomplished by notch monitor controller 128 applying the value of bias 302 to a timing of receipt (i.e., a time of arrival) of LP square-wave pulses 204 transmitted to notch monitor controller 128 as LP notch signal 126. As such, during operation of rotor synchronization system 300 at synchronization, notch monitor controller 128 receives a biased signal 310 and determines a constancy of offset 216 based on the timing of receipt of biased signal 310 and HP square-wave pulse 202. The value of offset 216, and thus the value of bias 302, determined during the calibration procedure remains the same throughout the life of cross-compound generator system 100 and rotor synchronization system 300. This is due to the fact that regardless of the relative positions of HP notch 116 and LP notch 118 at any time at any point during operation of cross-compound generator system 100, when the 2-P rotor 106 is electrically locked with the 4-P rotor 108, electromechanical coupling therebetween of the respective poles ensures that arcuate spacing between the HP notch 116 and LP notch 118 will always be constant, and thus offset 216 and bias 302 will always be constant upon rotor lock in a given installation of cross-compound generator system 100 and rotor synchronization system 300. Certain major maintenance events, including, without limitation, replacement of one or both rotors 106 and 108, one or both sensors 120 and 122, and/or one or both notches 116 and 118, would necessitate recalibration to determine anew the value of offset 216 and bias 302. However, replacement of one or both turning gears would not require a recalibration.

As such, just after simultaneous excitation of rotors 106 and 108, the value of first angular velocity of 2-P rotor 106 is exactly twice the value of second angular velocity of 4-P rotor 108, and continued adjustment of the angular velocities of rotors 106 and/or 108 (i.e., by using auxiliary throttle valves) is avoided. Avoidance of auxiliary throttle value usage prevents further stresses on the turning gear, and therefore reduces operating and maintenance costs, and failure rates. Also, during operation, simultaneous excitation of rotors 106 and 108 enables operation of HP and LP excitation controllers 140 and 142 independently from notch monitor controller 128, until generator system 100 is shutdown and/or started up again. Similarly, during operation of HP and LP excitation controllers 140 and 142 independent of notch monitor controller 128, it is unnecessary for sensors 120 and 122 to operate. In other embodiments, notch monitor controller 128 operates in cooperation with HP and LP excitation controllers 140 and 142 and/or sensors 120 and 122 throughout all times, and/or at user-specified times, during operation of cross-compound generator system 100.

Furthermore, rotor synchronization systems 200 and 300 enable 2-P rotor 106 and 4-P rotor 108 to be "locked in" in a more reliable manner and in a significantly lesser amount of time, e.g., a time representative of two revolutions of 2-P rotor 106, as compared to known cross-compound generator systems. Moreover, during operation of rotor synchronization systems 200 and 300, "locking in" of rotors 106 and 108 may be accomplished with higher excitation field voltages thereof, thus enabling lesser synchronization times during startup of generator system 100, as compared to known cross-compound turbine generator systems. After "locking in", i.e., electromechanically coupling rotor and stator windings of generator system 100, an excitation voltage may be selectively adjusted until generator system 100 is ready to be synchronized, and coupled to electrical loads on an electrical grid after 2-P rotor 106 and 4-P rotor 108 attain their respective synchronous speeds of 3600 RPM and 1800 RPM, respectively.

Figure 4:
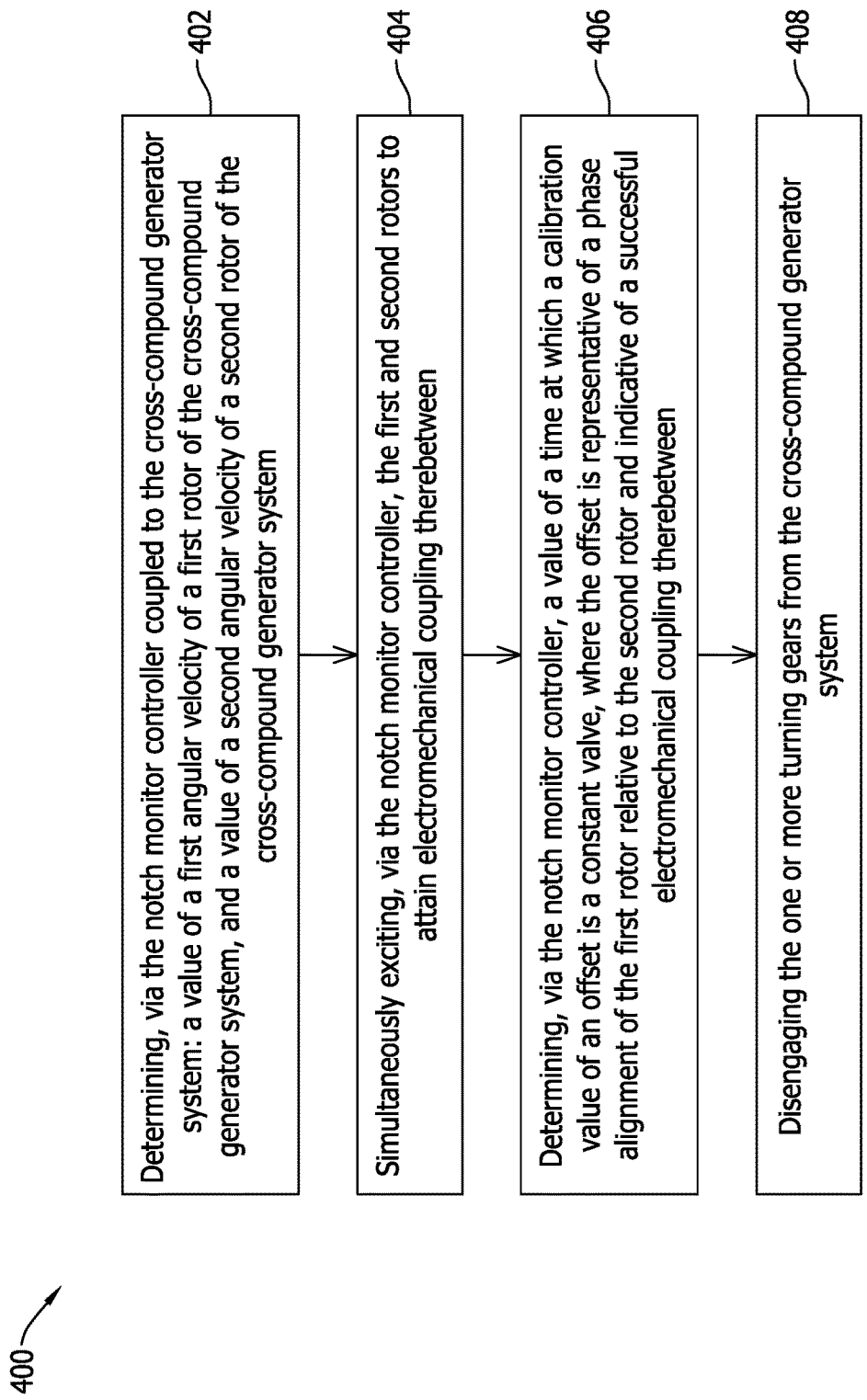
FIG. 4 is a flowchart of an exemplary method of synchronizing a cross-compound generator on one or more turning gears, and that may be used in the cross-compound generator system shown in FIG. 1.

FIG. 4 is a flowchart of an exemplary method 400 of synchronizing a cross-compound generator system on one or more turning gears, and that may be used with cross-compound generator system 100 (shown in FIG. 1). During implementation of method 400, a controller, such as notch monitor controller 128 (shown in FIGS. 1-3), coupled to cross-compound generator system 100 determines 402 a value of a first angular velocity of a first rotor, for example 2-P rotor 106 of cross-compound generator system 100 (shown in FIGS. 1-3). Notch monitor controller 128 also determines 404 a value of a second angular velocity of a second rotor, for example 4-P rotor 108 of cross-compound generator system 100 (shown in FIGS. 1-3). Also, during implementation of method 400, a controller, such as notch monitor controller 128, simultaneously excites 404 the first and second rotors to attain electromechanical coupling therebetween, as shown and described above with reference to FIGS. 2 and 3. Further, during implementation of method 400, a controller determines 406 a value of a time at which a calibration value of an offset, for example offset 216, is a constant value. In determining 406 step, the offset is representative of a phase alignment of the first rotor relative to the second rotor and the offset is also indicative of a successful electromechanical coupling therebetween, as shown and described above with reference to FIGS. 2 and 3. Furthermore, during implementation of method 400, the one or more turning gears are disengaged 408 from the cross-compound generator system, as shown and described above with reference to FIGS. 1-3.

The above-described systems and methods for synchronizing generators during startup on a turning gear facilitate synchronization without regard to relative positions of respective poles. Moreover, the above-described embodiments also facilitate preventing overload stresses on turning gears in cross-compound turbine generator systems. In addition, the above-described methods facilitate reducing maintenance costs of turning gears and the failure rate of turning gears used with cross-compound turbine generator systems. Furthermore, the above-described embodiments also facilitate use of larger field voltages, as compared to known systems, to enable the HP and LP rotors of cross-compound turbine generator systems to synchronize more quickly, and to obviate the need to use auxiliary throttle valves to bring the LP rotor speed up to the HP rotor speed during synchronization. Lastly, the above-described embodiments further facilitate reducing the synchronization time required during startup of cross-compound turbine generator systems, and reduce operating costs and outage times.

An exemplary technical effect of the above-described embodiments of systems and methods for synchronizing two generators during startup on a turning gear includes at least one of the following: (a) enabling synchronization without regard to relative positions of respective poles; (b) preventing overload stress on turning gears in cross-compound turbine generator systems; (c) reducing maintenance costs of turning gears in cross-compound turbine generator systems; (d) reducing the failure rate of turning gears; (e) facilitating use of larger field voltages to make the HP and LP rotors of cross-compound turbine generator systems synchronize more quickly; (f) obviating the need for auxiliary throttle valves to bring the LP rotor speed up to the HP rotor speed during synchronization of cross-compound turbine generator systems; (g) reducing the synchronization time required during startup of cross-compound turbine generator systems; and (h) reducing operating costs and outage times of cross-compound turbine generator systems.

Exemplary embodiments of systems and methods for synchronizing two generators during startup on a turning gear are not limited to the specific embodiments described herein, but rather, components of systems and/or steps of the methods may be utilized independently and separately from other components and/or steps described herein. For example, the methods, systems, and apparatus may also be used in combination with other systems requiring synchronization of rotors of two or more rotatable machines, and the associated methods, and are not limited to practice with only the systems and methods as described herein. Rather, the exemplary embodiments can be implemented and utilized in connection with many other applications, equipment, and systems that may benefit from using the above-described embodiments of systems and methods for synchronizing two generators during startup to improve the reliability and efficiency of operation for cross-compound turbine systems and other related systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer-readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A method of synchronizing a cross-compound generator system on one or more turning gears during startup, said method comprising:
  determining, via a notch monitor controller coupled to the cross-compound generator system:
    a value of a first angular velocity of a first rotor of the cross-compound generator system; and
    a value of a second angular velocity of a second rotor of the cross-compound generator system;
  simultaneously exciting, via the notch monitor controller, the first and second rotors to attain electromechanical coupling therebetween;
  determining, via the notch monitor controller, a value of a time at which a calibration value of an offset is a constant value, wherein the offset is representative of a phase alignment of the first rotor relative to the second rotor, and wherein the offset is indicative of a successful electromechanical coupling therebetween; and
  disengaging the one or more turning gears from the cross-compound generator system, wherein determining the value of a time at which a calibration value of an offset is a constant value comprises:
    determining, via the notch monitor controller, a first virtual sine wave representative of a first rotational period of the first rotor and a second virtual sine wave representative of a second rotational period of the second rotor:
    determining, via the notch monitor controller, at least one of the following:
      a value of a difference between a value of a first zero crossing time of the first virtual sine wave and a value of a second zero crossing time of the second virtual sine wave; and
      a value of a difference between a first time of arrival of a first rotation signal representative of the first rota- tional period, and a second time of arrival of a second rotation signal representative of the second rotational period; and applying, via the notch monitor controller, a value of a bias, the value of the bias substantially equal to the calibration value of the offset, to at least one of the following:
the first time of arrival;
the second time of arrival;
the first zero crossing time; and
the second zero crossing time, wherein said applying is performed after the time at which the calibration value of an offset is a constant value; and repeating said simultaneously exciting the first and second rotors, and not disengaging the one or more turning gears from the cross-compound generator system if the calibration value of the offset is not constant.

2. A method in accordance with claim 1, wherein:
determining a value of a first angular velocity of the first rotor comprises:
sensing, via a first sensor, a plurality of rotations of the first rotor, wherein a value of a first passage of time for each rotation of the plurality of rotations is substantially equivalent to a first period of rotation of the first rotor;
transmitting a first rotation signal from the first sensor to the notch monitor controller; and determining the first angular velocity from the value of the first passage time.

3. A method in accordance with claim 1, wherein:
determining a value of a second angular velocity of the second rotor comprises:
sensing, via a second sensor, a plurality of rotations of the second rotor, wherein a value of a second passage of time for each rotation of the plurality of rotations is substantially equivalent to a second period of rotation of the second rotor;
transmitting a second rotation signal from the second sensor to the notch monitor controller; and
determining the second angular velocity from the value of the second passage time.

4. A method in accordance with claim 1 further comprising comparing the calibration value of the offset with at least one of the following:
a value of a predetermined constant number; and
a value of a predetermined range of constant numbers.

5. A method in accordance with claim 1, wherein:
simultaneously exciting the first and second rotors comprises:
simultaneously transmitting, via the notch monitor controller:
a first excitation control signal to a first excitation system controller coupled to a first winding of the first rotor; and
a second excitation control signal to a second excitation system controller coupled to a second winding of the second rotor, wherein said simultaneously transmitting facilitates locking in of the first rotor and the second rotor; and
disengaging the one or more turning gears from the cross-compound generator system comprises:
transmitting, via a turning gear controller coupled to the cross-compound generator system and the notch monitor controller, a turning gear signal representative of a presence or an absence of a state of rotational coupling of the one or more turning gears to at least one of the first and second rotors.

6. A method in accordance with claim 1 further comprising displaying, via a human-machine interface coupled to the notch monitor controller, at least one of:
the value of the first angular velocity;
the value of the second angular velocity;
the calibration value of the offset;
the value of the time at which the calibration value of the offset is constant;
the first virtual sine wave;
the second virtual sine wave;
the value of the difference between the value of the first zero crossing time and the value of the second zero crossing time; and
the value of the difference between the first time of arrival and the second time of arrival.

7. A synchronization system for a cross-compound generator having a first rotor, a second rotor, and one or more turning gears coupled to at least one of the first and second rotors, said system comprising:
a notch monitor controller coupled to the cross-compound generator, said notch monitor controller configured to determine a value of a time at which a calibration value of an offset is a constant value, wherein the offset is representative of a phase alignment of the first rotor relative to the second rotor, and wherein the offset is indicative of a successful electromechanical coupling therebetween;
a first sensor coupled to the cross-compound generator for detecting a rotation of the first rotor;
a second sensor coupled to the cross-compound generator for detecting a rotation of the second rotor, said notch monitor controller further configured to simultaneously excite the first and second rotors after the time at which the value of the offset is constant,
wherein the cross-compound generator further includes a first winding coupled to the first rotor, and a second winding coupled to the second rotor, said synchronization system further comprising an excitation system comprising:
a first excitation system coupled to said notch monitor controller and the first winding;
a second excitation system coupled to said notch monitor controller and the second winding;
a first excitation system controller coupled to said notch monitor controller and said first excitation system;
a second excitation system controller coupled to said notch monitor controller and said second excitation system, said notch monitor controller further configured to:
transmit a first excitation control signal to said first excitation system controller to facilitate an excitation of the first winding; and
transmit a second excitation control signal to said second excitation system controller to facilitate an excitation of the second winding; and
an interconnect coupled to said first excitation system and said second excitation system, wherein said interconnect is configured to facilitate transmitting first and second excitation control signals together to further facilitate a simultaneous excitation of the first and second rotors.

8. A synchronization system in accordance with claim 7 further comprising a human-machine interface coupled to said notch monitor controller, said human-machine interface configured to display operational information associated with said synchronization system, the operational information including at least one of:
a value of a first angular velocity of the first rotor;

a value of a second angular velocity of the second rotor;
the calibration value of the offset;
the value of the time at which the calibration value of the offset is constant;
a first virtual sine wave representative of a first rotational period of the first rotor; and
a second virtual sine wave representative of a second rotational period of the second rotor.

9. A synchronization system in accordance with claim 7 further comprising:
a first field breaker coupled to said first excitation system and the first rotor; and
a second field breaker coupled to said second excitation system and the second rotor, wherein:
said first excitation system controller is configured to transmit a first field breaker control signal to said first field breaker to enable a first electrical current flow from said first excitation system to the first winding; and
said second excitation system controller is configured to transmit a second field breaker control signal to said second field breaker to enable a second electrical current flow from said second excitation system to the second winding.

10. A synchronization system in accordance with claim 7 further comprising a turning gear controller coupled to the cross-compound generator and said notch monitor controller, wherein said turning gear controller is configured to transmit a turning gear signal representative of a presence or an absence of a state of rotational coupling of the one or more turning gears to at least one of the first and second rotors.

11. A power generation facility comprising:
a cross-compound generator comprising:
a first generator comprising a first rotor;
a second generator comprising a second rotor; and
one or more turning gears rotatably coupled to at least one of said first and second rotors; and
a synchronization system comprising:
a notch monitor controller coupled to said cross-compound generator, said notch monitor controller configured to determine a value of a time at which a calibration value of an offset is a constant value, wherein the offset is representative of a phase alignment of the first rotor relative to the second rotor, and wherein the offset is indicative of a successful electromechanical coupling therebetween;
a first sensor coupled to said cross-compound generator for detecting a rotation of said first rotor; and
a second sensor coupled to said cross-compound generator for detecting a rotation of said second rotor, said notch monitor controller further configured to simultaneously excite said first and second rotors after the time at which the value of the offset is constant,
wherein said cross-compound generator further comprises a first winding coupled to said first rotor, and a second winding coupled to said second rotor, said synchronization system further comprising an excitation system comprising:
a first excitation system coupled to said notch monitor controller and said first winding;
a second excitation system coupled to said notch monitor controller and said second winding;
a first excitation system controller coupled to said notch monitor controller and said first excitation system;
a second excitation system controller coupled to said notch monitor controller and said second excitation system, said notch monitor controller further configured to:
transmit a first excitation control signal to said first excitation system controller to facilitate an excitation of said first winding; and
transmit a second excitation control signal to said second excitation system controller to facilitate an excitation of said second winding; and
an interconnect coupled to said first excitation system and said second excitation system, wherein said interconnect is configured to facilitate transmitting first and second excitation control signals together to further facilitate a simultaneous excitation of said first and second rotors.

12. A power generation facility in accordance with claim 11 further comprising a human-machine interface coupled to said notch monitor controller, said human-machine interface configured to display operational information associated with said synchronization system, the operational information including at least one of:
a value of a first angular velocity of said first rotor;
a value of a second angular velocity of said second rotor;
the calibration value of the offset;
the value of the time at which the calibration value of the offset is constant;
a first virtual sine wave representative of a first rotational period of said first rotor; and
a second virtual sine wave representative of a second rotational period of said second rotor.

13. A power generation facility in accordance with claim 11 further comprising:
a first field breaker coupled to said first excitation system and said first rotor; and
a second field breaker coupled to said second excitation system and said second rotor, wherein:
said first excitation system controller is configured to transmit a first field breaker control signal to said first field breaker to enable a first electrical current flow from said first excitation system to said first winding; and
said second excitation system controller is configured to transmit a second field breaker control signal to said second field breaker to enable a second electrical current flow from said second excitation system to said second winding.

14. A power generation facility in accordance with claim 11 further comprising a turning gear controller coupled to said cross-compound generator and said notch monitor controller, wherein said turning gear controller is configured to transmit a turning gear signal representative of a presence or an absence of a state of rotational coupling of said one or more turning gears to at least one of said first and second rotors.

* * * * *